Patented Mar. 21, 1950

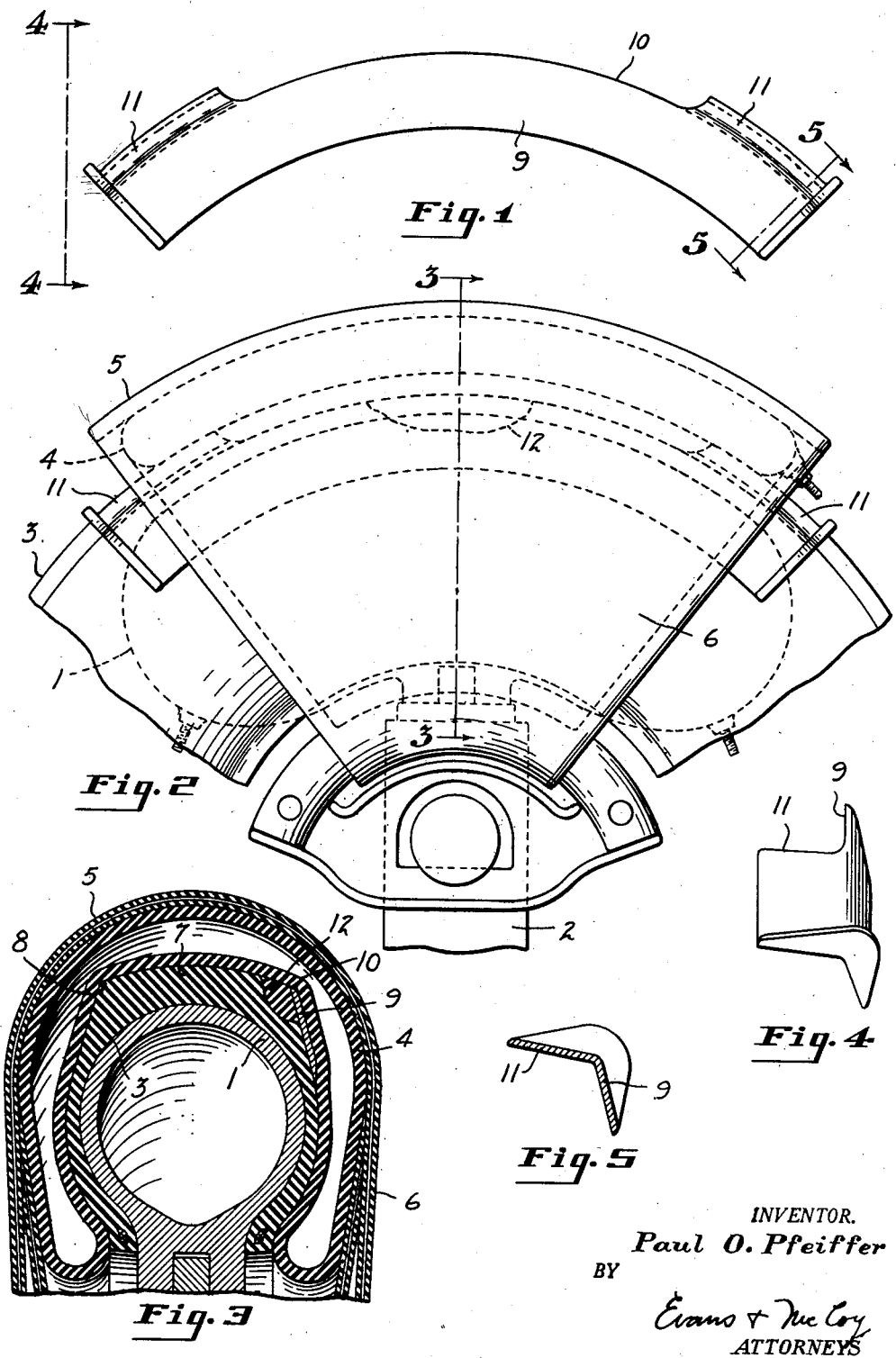

2,501,577

UNITED STATES PATENT OFFICE 2,501,577

TIRE REPAIR VULCANIZING APPARATUS

Paul O. Pfeiffer, Akron, Ohio, assignor to The General Tire and Rubber Company, Akron, Ohio, a corporation of Ohio Application September 5, 1946, Serial No. 694,941

2 Claims. (Cl. 18—18)

This invention relates to tire repair vulcanizing apparatus and more particularly to apparatus for vulcanizing repair material filling recesses in a tire tread along the shoulder thereof.

It is common practice in vulcanizing tire repairs to apply pressure exteriorly to the portion of the casing to which the unvulcanized rubber is applied, by means of a flexible inflatable bag which is held against the exterior of the tire casing. The bag when inflated conforms to the shape of the casing and maintains a substantially uniform pressure upon the material being vulcanized, but where recesses in the shoulder portions of a tire tread are filled with the soft vulcanizable material, the inflatable bag tends to assume a rounded shape at the corners where the soft material is placed, so that the repair material after it is vulcanized does not conform to the sharp corners between the side faces of the tread shoulders and the tire periphery.

The present invention is a mold insert for stiffening the mold at the tread shoulder so as to cause the repair material to conform to the sharp corner at the side edge of the tread.

With the above and other objects in view, the invention may be said to comprise the device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of the mold insert;

Fig. 2 is a side elevation showing the tire mold in place on a tire casing;

Fig. 3 is a section taken on the line indicated at 3—3 in Fig. 2;

Fig. 4 is an end elevation of the insert, and

Fig. 5 is a section taken on the line indicated at 5—5 in Fig. 1.

As shown in Fig. 3 of the drawing, a hollow rigid core 1 is mounted upon a suitable horizontal supporting arm 2 and provides a support for a tire casing 3 that fits upon the core 1. The tire casing 3 is held tightly against the core by means of an exterior inflatable bag 4 that engages the portion of the tire casing containing the core 1. The bag 4 is adapted to receive air or steam under pressure and applies a substantially uniform pressure upon the portion of the tire casing which it engages. The inflatable bag 4 is held in place on the tire casing by means of a flexible cover 5 which overlies the bag and which has sector-shaped ends 6 that are suitably anchored to the arm 2. The tire casing 3 is of conventional form and has a tread 7 which is formed to provide sharp corners 8 between the peripheral portion of the tire and the shoulder side faces.

In order to stiffen the mold at one or both of the tread shoulders an arcuate insert 9 is provided which is in the form of a substantially flat piece of metal shaped to conform to a side face of a tread shoulder and having an arcuate outer edge 10 of the same radius as the periphery of the tire casing and that is supported flush with the periphery of the tire casing.

At each end thereof the insert 9 is provided with a short lateral flange 11 which is disposed at an angle to the body of the insert which corresponds to the angle of the corner 8 of the tread shoulder and so positioned with respect to the outer edge 10 of the insert that when the flanges 11 rest upon the tread periphery the body portion of the insert lies against the side face of the tread shoulder with its outer edge 10 flush with the tread periphery, as shown in Figs. 2 and 3. The insert 9 is used when recesses such as indicated at 12 in Figs. 2 and 3 in a tread shoulder are to be filled with unvulcanized rubber to build up a damaged portion of the tread shoulder.

The inflation pressure acting upon the inner wall of the bag 4 tends to draw the inner wall to a shape round in cross section and if soft unvulcanized rubber is engaged by the bag at the tire shoulder the air bag is apt to be drawn inwardly to distort the repair material during the vulcanizing operation. However, when the insert 9 is positioned within the bag 4 a rigid wall is provided along the side of the tread shoulder which holds the inflatable bag to proper form at the tread shoulders. The insert 9 is reversible so that it can be placed along either shoulder of a tire casing and where necessary two of the inserts may be employed, one at each of the tire shoulders.

It is to be understood that variations and modifications of the specific device herein shown and described for purposes of illustration, may be made without departing from the spirit of the invention.

What I claim is:

1. In a repair vulcanizing mold comprising a core that engages the interior of a tire casing, an outer flexible inflatable bag adapted to fit over a portion of the tire casing and engageable exteriorly with the tread and shoulder portions of the tire casing and a cover member exteriorly engaging the bag for holding the bag in engagement with the tire casing, an arcuate stiffening insert having a substantially flat portion intermediate its ends shaped to conform to a side of the tread shoulder and having an outer edge of a curvature corresponding substantially to the circumferential curvature of the tread periphery, said insert having flanges adjacent its ends engageable with the tread periphery to position said outer edge substantially flush with the tread periphery, said stiffening member being reversible and engageable with either side of a tire tread.

2. A stiffening insert for tire repair vulcanizing molds comprising an arcuate metal member having an inner face that conforms to a side of a tire tread shoulder and short tread engaging positioning flanges at opposite ends extending laterally at an angle to said inner face corresponding to the angle between the periphery and side face of a tire tread for engagement with the tread periphery, said insert having an arcuate outer edge throughout the major portion of its length and intermediate said flanges that is adapted to lie substantially flush wtih the tire tread periphery between said positioning flanges.

PAUL O. PFEIFFER.

REFERENCES CITED

The following references are of record in the file of this patent:

UNITED STATES PATENTS

| Number | Name | Date |
| --- | --- | --- |
| 1,417,551 | Midgley | May 30, 1922 |
| 1,483,857 | Fitzharris | Feb. 12, 1924 |
| 1,637,879 | Semler | Aug. 2, 1927 |
| 2,318,779 | Hovlid | May 11, 1943 |